Figure 1:
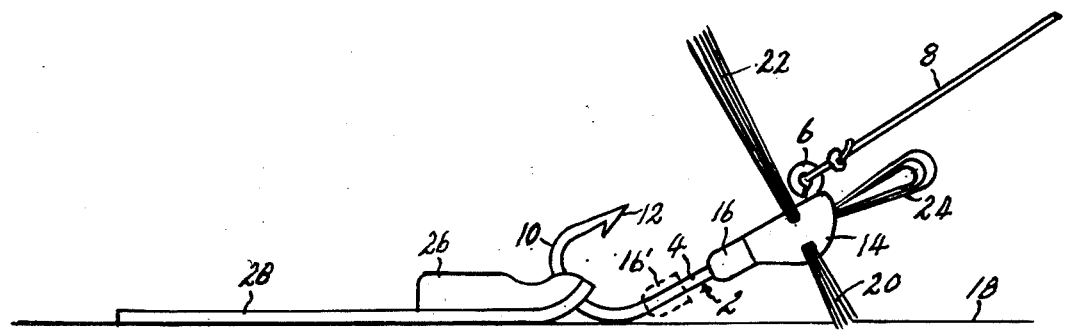

United States Patent [19]

Ancona

[11] 4,450,645
[45] May 29, 1984

[54] BOTTOM FISHING LURE

[76] Inventor: Frank A. Ancona, 5424 N. Tracy, Kansas City, Mo. 64118

[21] Appl. No.: 371,524

[22] Filed: Apr. 26, 1982

[51] Int. Cl.³ .............................................. A01K 85/00
[52] U.S. Cl. .................................. 43/42.25; 43/42.26; 43/42.29; 43/42.39; 43/44.81; 43/44.96
[58] Field of Search ................. 43/42.25, 42.26, 42.27, 43/42.29, 44.81, 44.96, 42.39

[56] References Cited

U.S. PATENT DOCUMENTS

| | | | |
|---|---|---|---|
| 882,882 | 3/1908 | Henzel | 43/44.81 |
| 1,734,346 | 11/1929 | Reinhardt | 43/42.25 |
| 2,612,717 | 10/1952 | Kuehnel | 43/42.25 |
| 2,752,720 | 7/1956 | Filipiak | 43/42.25 |
| 2,757,476 | 8/1956 | Pender | 43/42.25 |
| 3,461,598 | 8/1969 | Brewster | 43/42.29 |
| 3,638,347 | 2/1972 | Kochevar | 43/44.81 |
| 3,774,335 | 11/1973 | Sisty | 43/42.25 |

Primary Examiner—Nicholas P. Godici
Assistant Examiner—Marc Hodak
Attorney, Agent, or Firm—John A. Hamilton

[57] ABSTRACT

A bottom fishing lure consisting of a fishhook having a weighted, non-buoyant head adapted to be pulled head first along the bottom surface of a body of water by a fishing line, and adapted to carry a trailing bait, the hook being supported on the bottom on its bight portion and on an adjacent pair of a series of resilient legs carried by and extending radially from the head, each effective leg being movable during forward movement of the lure alternately to drag along the bottom, and to be resiliently flexed by the drag resistance, and then to free itself from the bottom and snap forwardly when the flexure force has built up to a sufficiently high level, the flexing and recovery pattern of the legs being such as to impart a forward "walking" motion, accompanied by a lateral waggling of the hook and bait. This creates an unusually lifelike "swimming" motion to the hook and bait which is highly attractive to feeding fish. On most bottoms, it also raises a cloud of silt, which is attractive to fish since it creates a resemblance to a burrowing crawddad or the like. The length of the legs and the weight distribution of the head are selected to encourage the hook to walk in a position with its point elevated well above the bottom.

11 Claims, 3 Drawing Figures

BOTTOM FISHING LURE

This invention relates to new and useful improvements in fishing gear, and more particularly to fishing lures. Specifically. it relates to a "bottom" fishing lure, this being a class of non-buoyant lures adapted to rest on and be drawn along the bottom of a body of water, and specially designed to attract bottom-feeding fish.

The overall object of the present invention is the provision of a lure of this class having novel provisions operable to impart to it a highly lifelike "swimming" motion as it is drawn along the bottom by a fishing line, so that it, as well as any natural or artifical bait attached thereto, resembles a small fish or the like swimming energetically along the bottom. This motion and appearance are highly attractive to feeding fish, and render the lure highly effective.

Generally, this object is accomplished by the provision of a lure consisting of a fishhook having a weighted head to render it heavily non-buoyant, and adapted to be drawn head first along the bottom by a fishing line, with the head supported slightly above the bottom by a pair of flexibly resilient legs extending laterally therefrom, and being inclined downwardly to engage the bottom. The action of these legs as they alternately drag on and are released from the bottom, produce an oscillation or "waggling" of the hook about a generally vertical axis, and this motion is transferred to any trailing bait attached to the hook as a laterally undulating or sinuous movement closely simulating the swimming movements of a small fish or the like.

Another object is the provision of a fishing lure of the character described provided with legs additional to the pair described above, the length of said additional legs, and the weight distribution of the head being so selected as to encourage the hook to assume a position with its point uppermost, even if it does not originally settle to the bottom in that position. Thus the hook is positioned to better arrange its point to engage in a fish's mouth, and to mimimize any fouling thereof by underwater vegetation.

Another object is the provision of a fishing lure of the character described having novel means, including an additional forwardly extending leg and an adjustable counterweight, operable to maintain the lure in its normal upright position, in order that the legs may perform their intended functions, regardless of variations in such factors as the weight and water drag of the bait carried thereby, the nature of the bottom surface, and the forward speed of travel of the lure.

Other objects are simplicity and economy of construction, and efficiency and dependability of operation.

Figure 2:
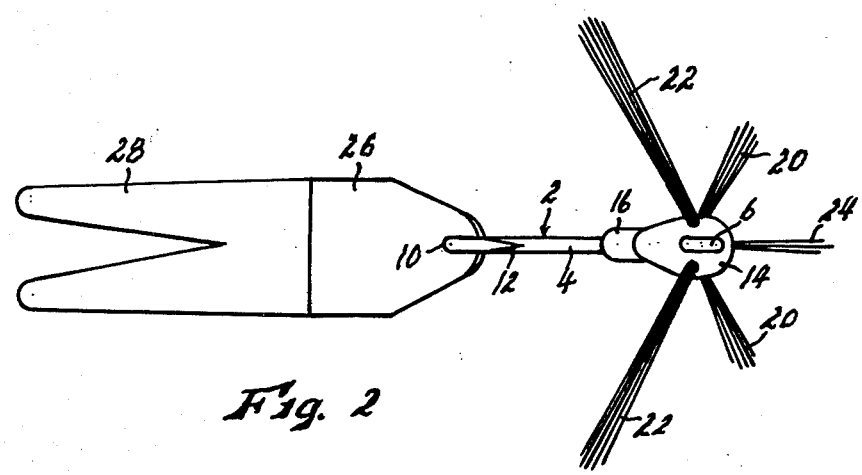
Figure 3:
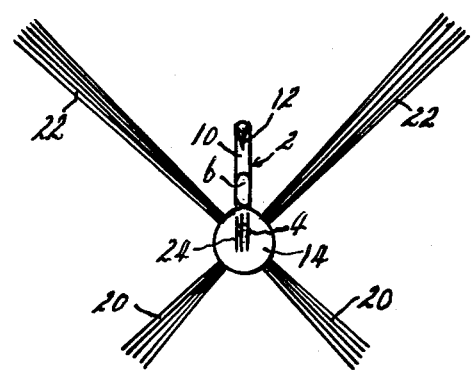

With these objects in view, as well as other objects which will appear in the course of the specification, reference will be had to the accompanying drawing, wherein:

FIG. 1 is a side elevational view of a fishing lure embodying the present invention, shown in a position it normally assumes at the bottom of a body of water, with a fishing line attached thereto, FIG. 2 is a top plan view of the lure as shown in FIG. 1, with the fishing line omitted, and FIG. 3 is a front elevational view of the lure.

Like reference numerals apply to similar parts throughout the several views, and the numeral 2 applies generally to a fishhook forming the main body of the lure. Said fishhook is of ordinary design, being formed of a length of wire forming a generally straight shank 4 angles at one end to extend to an eye 6 into which a fishing line 8 may be tied as indicated in FIG. 1, and having at its opposite end a rebent bight portion 10 terminating in a barbed point 12 extending generally toward eye 6.

The portion of hook shank 4 at and adjacent the angle thereof adjacent eye 6 is encased in a head member 14 constituting a lump of lead or other heavy metal molded thereabout. This is an ordinary feature of so-called "leadhead" jigs, and is common in the art. It will be noted that by far the greater portion of the mass of head 14 is disposed at the lateral side of shank 4 opposite to that at which hook point 12 is disposed. Also, a special feature of the present invention is a counter-weight 16 mounted on shank 4 intermediate head 14 and bight portion 10 of the fishhook. Said counterweight may constitute a small cylinder of lead molded concentrically about the shank, and is frictionally slidable therealong. That is, it may be moved along the shank by the application of substantial manual force thereto, but will not be moved by the forces exerted thereon in normal use.

A normal upright position of the lure on the bottom 18 of a body of water is shown in FIG. 1, with bight 10 of the hook disposed in a vertical plane and resting on bottom 18, and being drawn head end first through the water by fishing line 8, and with head 14 being supported slightly above bottom 18 by a pair of laterally extending side legs 20 affixed at their inner ends in head 14, and inclined outwardly and downwardly to engage bottom 18 at their outer ends. When the two legs 20 engage the bottom as shown, hook point 12 is disposed above shank 4, well above bottom 18. Diametrically opposite each of legs 20, an additional but longer side leg 22 is provided. Legs 22 are of such length that if the lure is supported on the bottom by them, they will support the lure in about the same attitude as when supported by legs 20 as in FIG. 1, though of course with the hook point closely adjacent bottom 18, and with head 14 substantially higher above bottom 18. All of legs 20 and 22 are disposed generally in a plane normal to hook shank 4, and each is resiliently flexible, being formed for example, by a small bundle of resilient strands molded at one end in head 14, the strands being formed of flexible plastic, such as brush bristles, or other suitable material. At their free outer ends, the strands are cut off sharply, in order better to penetrate into bottom 18 to supply better drag friction thereagainst. Head 14 is also provided with a forwardly projecting front leg 24, which engages bottom 18 only when the lure tends to overturn or "tumble" forwardly, as will appear. Front leg 24 may also be formed of resilient plastic strands, but instead of being cut off sharply, the strands are formed as open rounded loops, as shown in FIG. 1, so that if they engage bottom 18, they skip freely thereover rather than penetrating into said bottom.

The fishhook may be baited in various ways, as desired. For example, there is illustrated a "pork bait" consisting of a small chunk 26 of pork meat engaged over the point and onto the bight portion of the hook, and having a strip 28 of attached pork hide extending rearwardly behind the hook, and cut to resemble fish tails or the like. Other suitable baits could be similarly attached, it being preferable that such baits be of substantial length and easily pliable or flexible, in order to be capable of assuming a sinuous motion in the water.

Also, although not shown, feathers, limp rubber strands or the like could be attached to head 14, or to counterweight 16, to trail behind the lure to simulate the appearance of a body member associated with head 14. When so attached, they would also camouflage the point of the fishhook, although this function is not pertinent to the present invention. Also, another bundle of resilient strands similar to legs 20 and 22 could be fixed in head 14 and extended rearwardly adjacent hook point 12 to form a weedguard operable to prevent fouling of the hook by underwater vegetation, but this too is not pertinent to the present invention.

In operation, the lure is dropped into the water at the end of fishing line 8, and eventually comes to rest on bottom 18, supported by the bight portion 10 of the hook, and on any adjacent pairs of legs 20 and 22. As the lure settles through the water, the fact that the preponderance of the weight of head 14 is disposed at the side of shank 4 opposite to point 12 encourages the lure to tend to assume the upright position shown in FIG. 1, with the point above the shank and the head supported by the two shorter legs 20. This is the preferred or "upright" position of the lure on the bottom, preferred because it positions the point most advantageously to engage in the mouth of a fish, and also in a position least likely to become fouled by underwater vegetation. However, the lure could also come to rest supported by the two longer legs 22, or on one of legs 20 and one of legs 22. The lure is then pulled forwardly along the bottom, or to the right as viewed in FIG. 1, by means of fishing line 8. Due to the drag, or resistance to movement of legs 20 and 22 over the bottom, this drag being occasioned by the fact that the strands of said legs penetrate slightly into said bottom, or encounter obstructions such as sand or gravel particles to free movement thereover, the legs then tend to be bent or flexed rearwardly as the pull of line 8 continues and increases. Considering first only the action of the two legs actually engaging the bottom, it will be apparent that inevitably one of the legs or the other will encounter greater drag resistance than the other, with the result that that leg tends to remain stationary on, or to move more slowly over, the bottom, while the other leg moves relatively freely, or more rapidly, over the bottom. The lure thus turns on a vertical axis, the vertical plane of fishhook 2 being moved to a horizontal angle relative to that of the fishing line, and the rearward end (bight 10) moving to one side of the vertical plane of line 8. Eventually, the continuing pull of the line will so increase the forward force on the then "stuck" or trailing leg 20 that it is pulled, or "snaps" free of the bottom, the resilient recovery of that leg then elevating that side of the lure slightly, so that that leg then moves forwardly much more freely than the other leg 20. Said other leg is then substantially supporting the lure, and becomes the relatively "fixed" leg as the just-freed leg moves forwardly with relative freedom. The lure thus turns horizontally, about a generally vertical axis, in the opposite direction to that previously described, and the rearward or bight end of the hook moves horizontally in the opposite direction. This alternately opposite horizontal turning of the lure continues repetitively as long as the forward pull of line 8 is maintained, so that said lure "walks" on the two operating legs in a type of "hopping" motion, with the rearward or bight end of the fishhook oscillating or "waggling" laterally and horizontally. This horizontal waggling tends to be concentrated or confined to the rearward end of the hook, not its forward or head end, due to the inertia of its relatively heavy head 14, and also because its forward end is constrained laterally due to its connection to line 8. The lateral waggling of the bight end of the hook is transmitted to bait 26–28 as a laterally sinuous undulation of said bait, which is a realistically lifelike swimming motion simulating that of a small fish or the like, and is highly attractive to feeding fish, so that they attack the bait and are snagged on the hook. It is for this reason that pliable or flexible baits, trailing to a substantial distance behind the hook, are preferred for use with this lure, although the bait is of course not in itself an element of the lure. Also, the alternate engagement with and disengagement from the bottom of each leg, which occurs during the described walking motion, tends to disturb and raise clouds of silt around the lure, so long of course as the bottom includes silt as a part of its makeup, as do most bottoms. The silt coulds create a resemblance to the appearance of a crawddad or the like attempting to burrow itself into the bottom, and is highly attractive to feeding fish.

If the lure should come to rest on the bottom on the two longer legs 22, or on one short leg and one long leg, the described walking motion may still occur, but there will also be a strong tendency for the lure to right itself to the described and preferred "upright" position as it is pulled forwardly, within a very short forward travel. The lure tends to rock or "waddle" laterally during the walking motion, so that one effective leg or the other is nearly always out of contact with the bottom. In any position of the lure other than upright, the disposition of the mass of weight 14 is elevated as compared to its disposition when the lure is upright, and therefore exerts a constant torque tending to turn the lure to its upright position. Also, in turning to its upright position from any other angular position, the lure is actually "falling" by gravity from a higher position, in which it is supported by a longer leg, to a lower position in which it is supported by shorter legs. This "falling" motion occurs naturally and normally, so that the lure, during its walking, hopping and waddling motion soon assumes its upright position.

It will be readily apparent that for the described motion to occur, the lure must be maintained generally in the position of FIG. 1, regardless of which pair of legs 20 or 22 are supported head 14. It will of course be obvious that the pull on line 8 exerted by a fisherman must not be so rapid or forcible as to elevate the lure out of contact with bottom 18 against its own degree of non-buoyancy. When the lure is on the bottom, its stability against lateral overturning is reasonably guaranteed by the widespread stance of the effective pair of legs, best shown in FIG. 3. However, special provision is required to prevent forward overturning, or "tumbling" of the lure, since the drag of the lure legs on the bottom 18 will vary substantially with the character of said bottom, that is, whether it is mud, sand, gravel or the like, and the weight of the lure disposed behind the points of bottom contact of the legs may not be sufficient to prevent tumbling. The weight and water drag of bait 26–28 of course resists tumbling, but baits of sufficient weight and drag to prevent tumbling may not always be used. For example, lightweight rubber strands, feathers and the like affixed to head 14 would not normally be sufficiently heavy, and are applied to the lure too close to the legs themselves, to resist tumbling effectively. However, two features of the present lure do effectively resist tumbling. First, front leg 24 engages bottom 18 well forwardly of the transverse line of the legs, if the lure should tilt forwardly, and thus tends quite effectively to stabilize the lure against forward tumbling, up to a reasonable degree. It does not penetrate into the bottom, which would in fact aggravate tumbling, but skips freely thereover. Second, counterweight 16 may be moved slidably to the rear along shank 4 of the fishhook, as shown at 16' in FIG. 1, thus shifting the center of gravity of the lure farther to the rear of the legs, and improving its stability against forward tumbling. This adjustment would of course be used especially when very lightweight baits, or no bait at all, is secured to the fishhook bight 10, or when the bottom is of such nature as to present an unusually high resistance to movement of the legs thereover.

Finally, it should be noted that legs 20 and 22 serve at all times as weed guards for hook point 12, tending to fend underwater vegetation away from said point to prevent fouling thereof.

While I have shown and described a specific embodiment of my invention, it will be readily apparent that many minor changes of structure and operation could be made without departing from the spirit of the invention.

What I claim as new and desire to protect by Letters Patent is:

1. A fishing lure comprising:
a. a fishhook having a shank portion with an eye for the attachment of a fishing line at one end thereof, and a rebent bight terminating in a point at its opposite end,
b. a weighted head secured to said hook shank adjacent said eye and rendering said lure positively non-buoyant, to the extent that it will sink to the bottom of a body of water, and remain in engagement with said bottom as the lure is pulled forwardly at normal speeds by said fishing line, and
c. a first pair of resilient legs secured in and extending outwardly from said head laterally of said shank, said lure having an upright position resting on the bottom of a body of water, when deposited in water and allowed to sink to said bottom, in which position said hook rests on said bottom and is disposed in a generally vertical plane, with the point thereof uppermost, and with said shank angled upwardly from said bottom to said head, said legs extending transversely in opposite directions from said vertical plane in outwardly and downwardly inclined relation relative to said upright position, whereby to engage said bottom at their outer lower ends to support said head in spaced relation above said bottom, said fishhook being operable to be drawn forwardly, or head end first, over said bottom by tension on said fishing line.

2. A lure as recited in claim 1 wherein said resilient legs are of sufficient strength to support the weight of said head out of contact with said bottom, but may be resiliently flexed by the resistance to movement of the lower ends thereof along said bottom as said lure is drawn forwardly by said fishing line.

3. A lure as recited in claim 2 wherein each of said legs comprises a bundle of flexibly resilient strands fixed at one end in said head, and otherwise unconnected along their entire lengths, whereby to tend to penetrate into said bottom.

4. A lure as recited in claim 2 wherein said weighted head is secured to said shank with its center of gravity disposed eccentrically to said shank at the side thereof opposite to that at which said hook point is disposed, whereby said head exerts a constant torque on said fishhook, angularly of the shank thereof, tending to turn said fishhook to said upright position, with the point thereof uppermost, as said lure settles through the water to said bottom.

5. A lure as recited in claim 2 with the addition of a second pair of said resilient legs secured in said head and extending outwardly therefrom laterally of said shank, each of said second pair of legs projecting from said head in a direction generally opposite from one of said first pair of legs, so as to be inclined outwardly and upwardly relative to said upright lure position, whereby said lure may come to rest on the bottom with the head thereof supported by any adjacent pair of said legs.

6. A lure as recited in claim 5 wherein said second pair of legs are longer than said first pair of legs, whereby said lure may be supported in a position inverted from said upright position by the bight of said fishhook and by said longer pair of legs, or by one leg of each pair.

7. A lure as recited in claim 6 wherein said weighted head is secured to said fishhook with its center of gravity disposed eccentrically to said shank at the side thereof opposite to that at which the point of the fishhook is disposed.

8. A lure as recited in claim 2 with the addition of a front leg secured in and projecting forwardly from said head, whereby to engage said bottom at its forward end whenever said lure tilts forwardly from said upright position, said front leg being configurated to slide freely over said bottom.

9. A lure as recited in claim 8 wherein said front leg comprises a bundle of resilient strands secured at one end in said head and having the form of openly rounded loops at the free end of said leg.

10. A lure as recited in claim 2 with the addition of a counterweight mounted on the shank of said fishhook intermediate said head and the bight portion of said hook.

11. A lure as recited in claim 10 wherein said counterweight is adjustably movable along the shank portion of said fishhook.

* * * * *